July 26, 1966  B. OXEL  3,262,151
APPARATUS FOR MOLDING PLASTIC MATERIAL
Filed Sept. 30, 1964  2 Sheets-Sheet 1
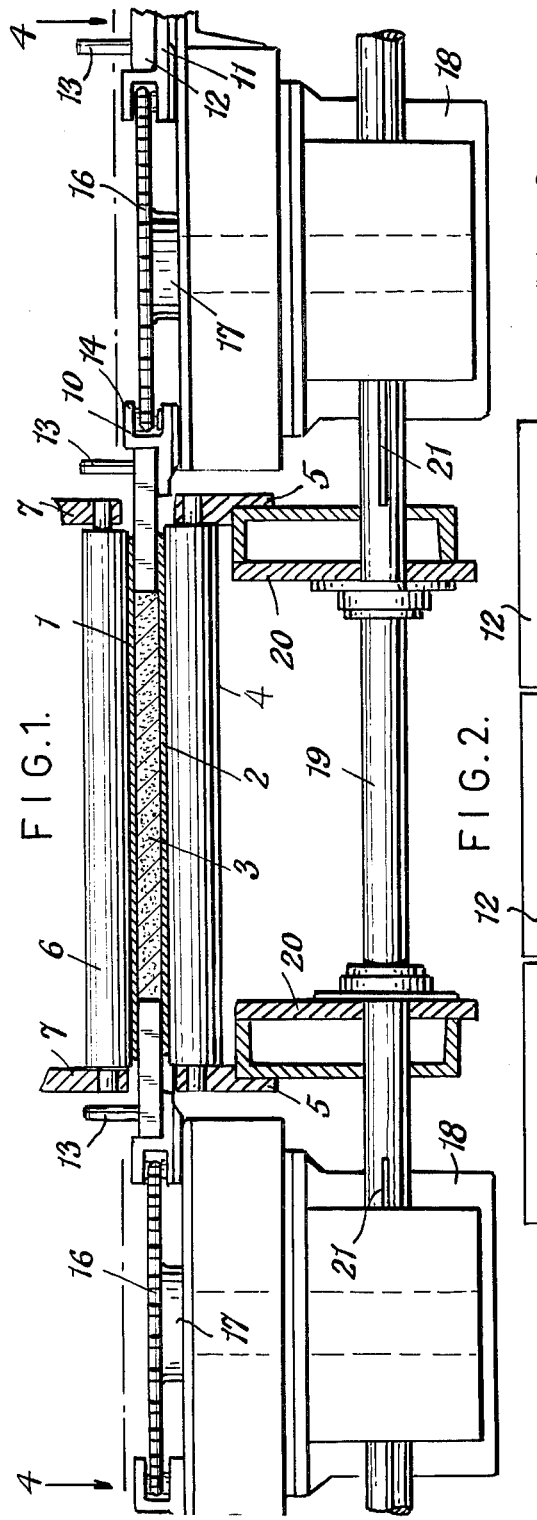
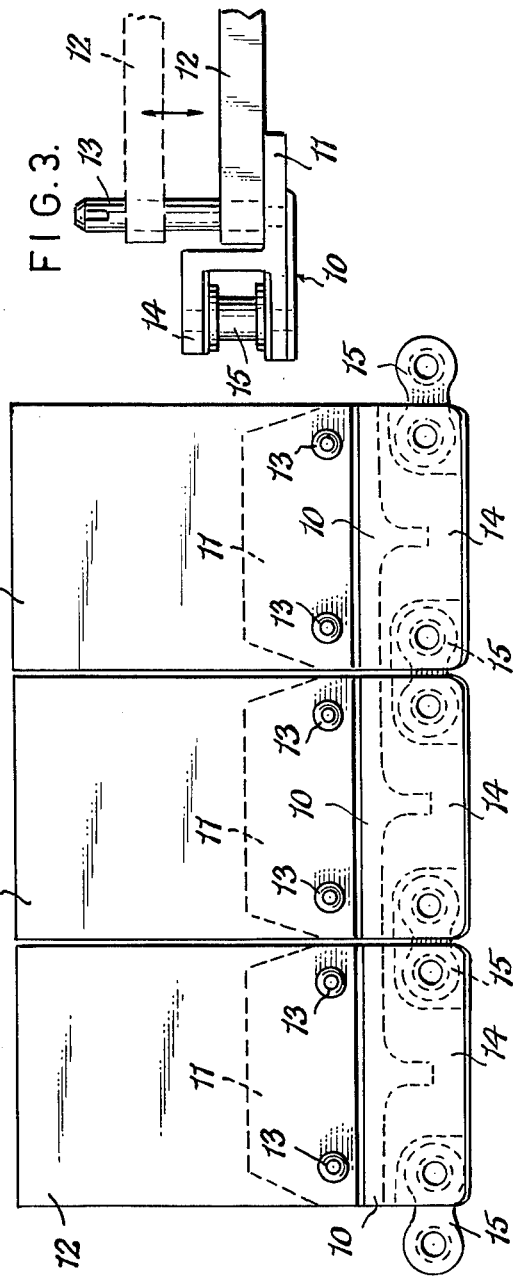
INVENTOR.
BERTON R. OXEL
BY ERIC Y. MUNSON
Attorney

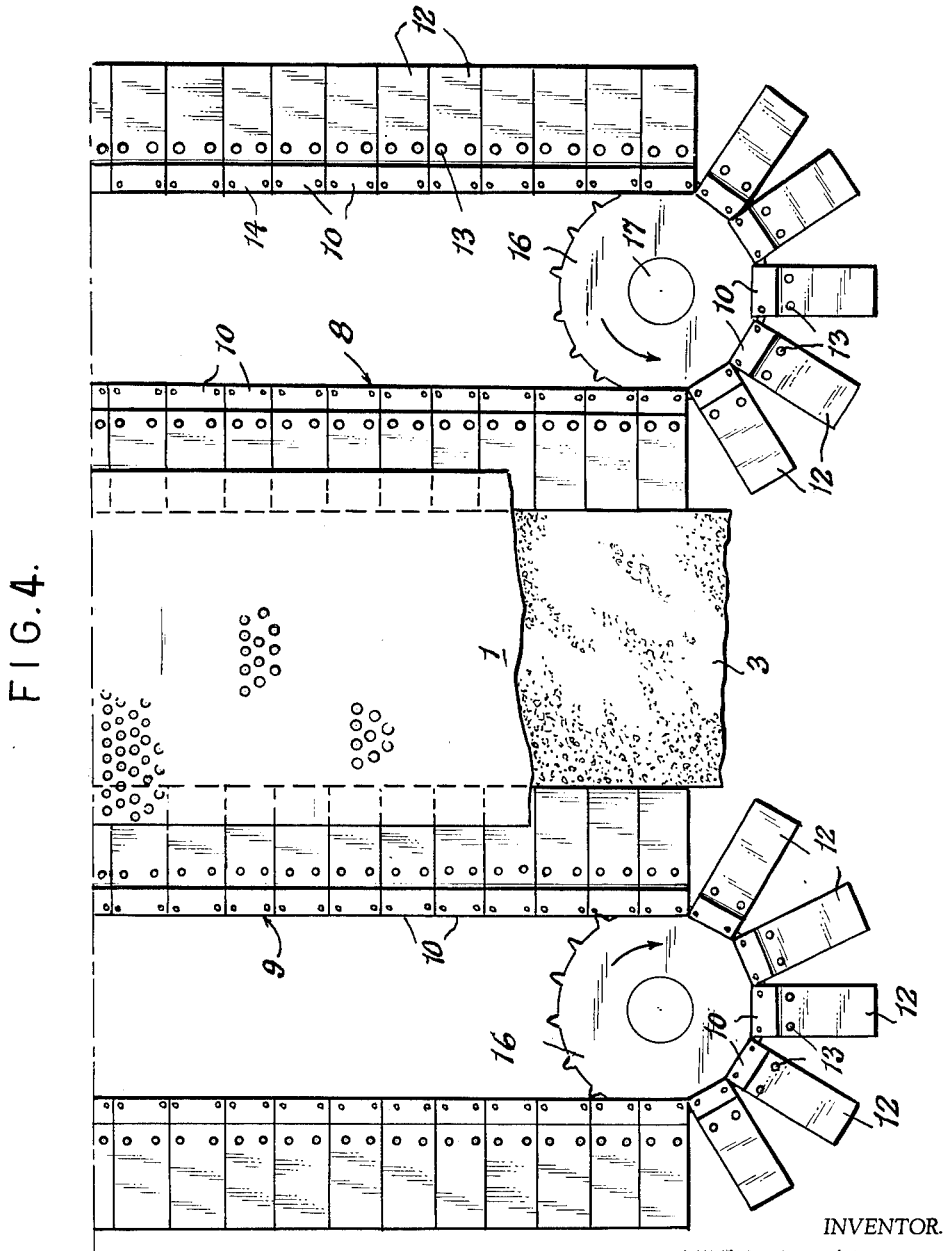

United States Patent Office 3,262,151
Patented July 26, 1966

3,262,151
APPARATUS FOR MOLDING PLASTIC MATERIAL
Berton Oxel, New Castle, Pa., assignor to Dyfoam Corporation, New Castle, Pa., a corporation of Pennsylvania
Filed Sept. 30, 1964, Ser. No. 400,339
8 Claims. (Cl. 18—4)

This invention relates to apparatus for molding plastic material, such as for example, polystyrene expandable beads, and particularly for the molding of flat panelling or slabs by a continuous molding process.

In carrying out such a continuous molding process, the material to be molded is deposited between a pair of spaced-apart perforated travelling bands or belts which are backed by rollers and which carry the material through suitable heating and cooling steps to complete the molding thereof. The space between the bands or belts in which the material is molded, is closed along the side edges of the bands by other travelling bands which confine the material in the molding space.

In molding the material in the form of flat panelling or slabs, it is desirable that some means be provided by which panels of various widths can be made and it is therefore one of the objects of the present invention to provide means by which the regulation of the width of the panelling can be had.

More particularly, the invention contemplates the provision of a pair of spaced belts or bands defining a space between them in which the plastic material is molded, and of means for closing said space at the sides, which means serve as side walls for the molding space and confine the material between them and thus determine the width of the molded panelling.

The invention further contemplates the provision of means by which said mold-closing elements shall be removable and interchangeable with others of different proportions whereby the space which constitutes the mold can be increased or decreased in width and the resultant molded product can be thus increased or decreased in width.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a vertical transverse sectional view of an apparatus constructed in accordance with the present invention;

FIG. 2 is an enlarged plan view of a portion of the articulated side wall for the mold space;

FIG. 3 is a view of one of the seats or carriers for the spacing blocks, with one of the blocks fitted on it and, FIG. 4 is a view taken substantially on the line 4—4 of FIG. 1, looking in the direction of the arrows.

In an apparatus employed for the continuous molding of sheets, panels, slabs and the like of plastic material such as that produced from expanded polystyrene beads, the material is delivered from hoppers and by means of suitable feeding apparatus is fed between a pair of moving bands or belts, the spacing between such bands or belts determining the thickness of the molded panelling. These bands or belts, which are perforated or foraminous, extend around driven rotating drums at the opposite ends of the machine, and the plastic material in its travel from the entrance end of the machine to the outlet end thereof, passes through a steam chest and through a cooling chamber to thereby subject the polystyrene beads to expansion and subsequent setting into the required panel or slab formation. The belts or bands are perforated or foraminous to allow the steam to reach the material and cause the required expansion thereof.

In the drawings, the upper one of the travelling metallic foraminous bands or belts is shown at 1. A similar lower belt is shown at 2 and the polystyrene bead material that is being molded between these belts or bands, is indicated at 3. The lower belt 2 is supported from below by a substantial number of rollers 4 which are rotatively supported in frame portions 5. Rollers 6 are rotatively supported by frame elements 7 above the upper belt 1.

The width of the produced panelling or slab material 3 that is produced by the above means is determined by side guides for the belts and in the present embodiment of the invention such guides consists of endless chains or articulated members indicated respectively at 8 and 9 in FIG. 4. Each of said guides consists of a plurality of coupled-together carriers or seats 10 having the construction clearly disclosed in FIGS. 2 and 3. Each of these seats or carriers having a flat horizontal surface or ledge 11 forming a seat or rest for a spacer block or slab 12 constituting a mold wall and which fits closely but slidably in the space between the upper and lower belts or bands 1 and 2. The block or slab 12 has a pair of holes through it which fit around upstanding pins or posts 13 which are threaded into the part 11 of the seat or carrier and project vertically therefrom. Behind the pins 13, the seat or carrier is clevised, as shown at 14 and this clevised part receives pivoted chain links 15 substantially as shown in FIG. 2. The links 15 couple the seats or carriers 10 articulatively together to form an endless chain which extends around a sprocket 16 at each end of the machine.

Each of the sprockets 16 is fitted on a vertical shaft 17 located in a gear box 18 containing suitable gearing for driving the sprockets at the required speed to enable the chains 8 and 9 to travel along with the belts 1 and 2. The gearing in the gear boxes 18 is driven by a shaft 19 that is rotative in the frame elements 20 driven from a suitable power source.

As will be seen in FIGS. 1 and 4, the two chains 8 and 9, composed of the articulatively coupled block carriers or seats 10, are respectively located along the opposite longitudinal edges of the belts or bands 1 and 2, with the result that the blocks or slabs 12 project into the space between the bands. Thus, the forward ends of these blocks or slabs constitute the side walls for the mold space that is defined at the top and bottom by the belts or bands 1 and 2. The sides of such space are closed by the ends of the blocks 12 as will be apparent from FIG. 1.

The blocks or slabs 12 are fitted on the seats or carriers 10 by being fitted on the pins 13 and brought to rest on top of the ledge 11 in the manner shown in dotted lines and by the arrow in FIG. 3. Since the blocks 12 are readily removable, blocks of different lengths can be easily fitted on the seats, thus increasing or decreasing the width of the effective space between the belts or bands 1 and 2 and accordingly producing either a wider or a narrower molded panel or slab according to the length of the blocks 12 then being used.

From the foregoing, the operation of the disclosed structure will be readily apparent. The belts or bands 1 and 2 having the spacing between them closed at the sides by the blocks 12 on the moving chains 8 and 9 so that the material being molded is confined above and below by the belts or bands 1 and 2 and at the sides by the blocks 12 which are slidably moved along with the belts. Since the blocks 12 can be readily changed for others of different lengths, it is evident that this can change the effective width of the molding space and can increase or decrease the width of the produced panelling or slab. An additional adjustment is possible by moving the sprockets and associated parts apart or bringing them toward one another. The drive shaft 19 is splined as shown at 21 to permit the gear boxes 18 and the contained gearing to be adjusted longitudinally of the shaft 19 if and when required to thereby move the chains 8 and 9 toward one another or apart.

Having thus described a single embodiment of the invention, it is obvious that the same is not to be restricted thereto, but is broad enough to cover all structures coming within the scope of the annexed claims.

What I claim is:

1. In an apparatus for molding a plastic material, a pair of moving bands defining a space between them in which the material is molded, a pair of moving elements travelling in company with the bands and projecting into said space and constituting closures for such space at the opposite edges of the bands, and a plurality of removable blocks carried on said elements and projecting between the belts and into said space, the lengths of said blocks determining the width of the body of material that is molded in said space between the bands.

2. In an apparatus for molding a plastic material such as expanded polystyrene, a pair of endless bands defining a space between them in which the material is molded, chains movable along the opposite edges of the bands, the chains being composed of links, each of which carries a removable block, said blocks entering between the bands and determining the width of the body of molded material that is molded between the bands.

3. In an apparatus for molding a plastic material as provided for in claim 2, wherein each of the links in each chain includes a ledge on which one of the blocks is rested, pins extending from such ledge, the block having holes through which the pins extend.

4. In an apparatus for molding a plastic material such as polystyrene, a pair of travelling bands having horizontal stretches defining a space between them in which the material is molded, a chain travelling along each edge of the bands, sprockets engaging and moving the chains in the same direction of travel as that of the bands, each chain having a plurality of separate flat slabs entering into the space between the bands and closing said space at its opposite sides, and means for detachably mounting the slabs on the chain, said means consisting of elements articulatively coupled together.

5. In an apparatus as provided for in claim 4, wherein each chain has links composed of carriers for the slabs, each carrier having a flat, upwardly facing ledge on which the slab is rested, pins extending upwardly from the ledge, and the slab having holes through which said pins project.

6. In an apparatus for molding a plastic material, such as expanded polystyrene, a pair of upper and lower moving bands defining a space between them in which the material is molded, travelling articulated members carried by chains and movable along the opposite side edges of the bands, said members being movable with said chains in the same direction as the bands, a plurality of separate projections carried by said members separately attached thereto and separately removable therefrom, said projections entering the space between said bands and having at least the outer ends thereof in close abutting edge to edge relationship and being of a thickness substantially equal to the space between said bands, said projections thereby acting as closures for the opposite ends of the said space and regulating the width of the material removable between the pairs of bands.

7. In an apparatus as provided for in claim 6, including means for mounting the projections on the articulated members, said means comprising pins on the articulated members entering holes in the projections, and the projections consisting of flat blocks terminating in free ends formed with flat end surfaces.

8. In an apparatus for molding a plastic material comprising, a pair of perforated bands having parallel spaced apart stretches defining a space between them in which the material is molded, and closure means for the opposite ends of said space comprising a plurality of blocks articulatively connected together and entering said space adjacent to the opposite longitudinal edges of the belts, means for removably mounting the blocks whereby blocks of different lengths can be used to thereby regulate the width of the material being molded in said molding space.

References Cited by the Examiner

UNITED STATES PATENTS

| | | | |
|---|---|---|---|
| 1,465,326 | 8/1923 | Zimmer. | |
| 1,692,420 | 11/1928 | Ruby | 25—99 |
| 1,953,704 | 3/1934 | Erdmann. | |
| 2,159,543 | 5/1939 | Baker | 18—6 |
| 2,240,251 | 4/1941 | Baker et al. | 18—6 |
| 3,167,603 | 1/1965 | Lille | 18—4 XR |
| 3,178,768 | 4/1965 | Edberg | 18—4 |

WILLIAM J. STEPHENSON, *Primary Examiner.*